Aug. 8, 1933.    R. BARANOWSKY    1,921,448
OSCILLATION CIRCUIT FOR SHORT WAVE GENERATORS
Filed Sept. 5, 1930

INVENTOR
RAOUL BARANOWSKY
BY
ATTORNEY

Patented Aug. 8, 1933

1,921,448

UNITED STATES PATENT OFFICE 1,921,448

OSCILLATION CIRCUIT FOR SHORT-WAVE GENERATORS

Raoul Baranowsky, Berlin, Germany, assignor to Telefunken Gesellschaft für Drahtlose Telegraphie m. b. H., Berlin, Germany, a Corporation of Germany Application September 5, 1930, Serial No. 479,849, and in Germany September 9, 1929

3 Claims. (Cl. 250—36)

The present invention relates to oscillation circuits which are particularly adapted for use with thermionic generators used for producing short waves.

In self-excited transmitter tubes previously known in the art which are connected "three-point-fashion" for producing ultra-short waves, the inductance of the oscillation circuit consists in most cases of a simple clip or loop of wire which is connected to act as a voltage divider in such a way that the plate potential supply lead is brought to the loop and is shiftably or slidably mounted thereon.

However, one drawback of a circuit scheme of such type is that the full grid alternating current comes to act on the choke coil through which the grid is fed, and since there are really no particularly efficient choke coils for short waves, it follows that the grid choke coil will always constitute a source of trouble.

It is, therefore, one of the primary objects of my invention to avoid these objections and to provide a simple oscillation circuit for short wave generators such as will not have the objectionable features which were known in the prior art.

Figure 1:
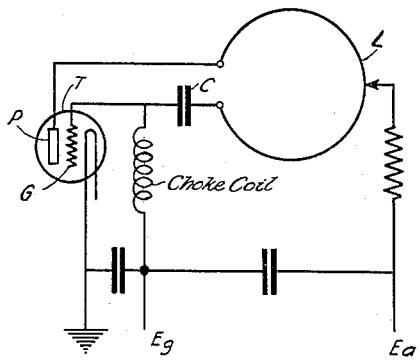
Figure 2:
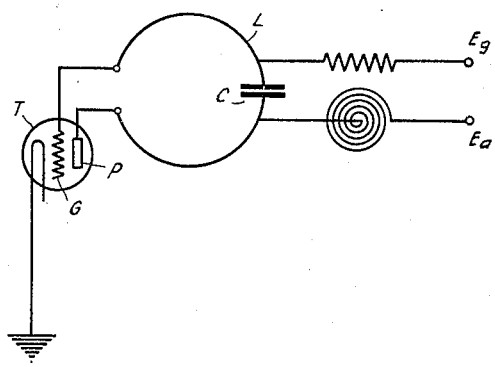

Other objects, of course, will suggest themselves and become apparent to those skilled in the art to which the invention relates by reading the following specification and claims in connection with the accompanying drawing, which shows by way of example in Fig. 1 a form of oscillatory circuit heretofore known; Fig. 2 shows an improvement on the oscillatory circuit of Fig. 1 wherein some of the objectionable features have been avoided by connecting the grid condenser at mid-point of the inductance loop, although this may not be an exact nodal point; and Fig. 3 shows a still further improvement on the circuit arrangement of Fig. 2 showing an adjustable means for moving the grid condenser.

Referring first to Fig. 1, it will be seen that there is a loop L connecting the grid and plate elements of a tube T through a condenser C, and upon the loop L, and connected in such a way as to act as a voltage divider, the plate potential supply lead from the source Ea is shiftably or slidably clamped fast so to be fixed for any predetermined condition. One end of the loop of wire L is connected with the grid by way of a blocking or invariable condenser and the grid is fed with direct current by way of the choke coil from a source Eg. However, with such an arrangement it is seen that the full grid alternating current comes to act on the choke coil and constitutes a source of trouble.

The drawbacks of Fig. 1 may be obviated and avoided according to the present disclosure to some extent by arranging the fixed condenser C with respect to the loop L in such position that it is at substantially the mid-point of the loop. However, this may not be an exact nodal point due to dissymmetry in construction and tube characteristics, and, accordingly, adjustments may be made to compensate for this difficulty.

Figure 3:
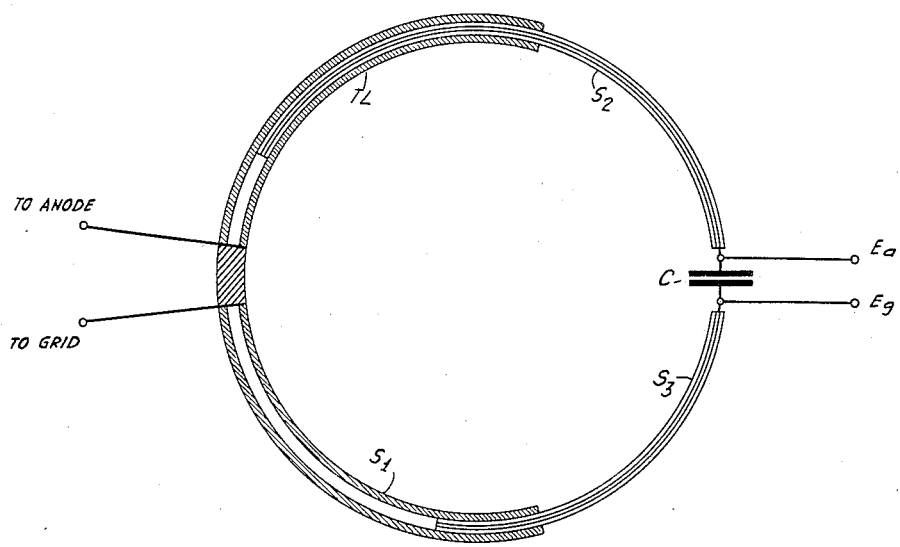

Therefore, according to the construction shown by Fig. 3, the difficulties occasioned with the arrangement of Fig. 2 have been avoided by arranging the condenser C, which is connected to the plate and grid elements P and G of the tube T and across whose terminals plate and grid potentials Ea and Eg are supplied, in such manner as to enable the condenser to be moved shiftably with respect to the points of connection of the loop to the anode and grid. This has been provided by forming the loop TL in a sort of trombone or telescope form in such manner that by shifting the condenser on the loop the tuning of the oscillation circuit is not essentially altered. According to such an arrangement, the inductance TL preferably consists of three circular segments, $S_1$, $S_2$, and $S_3$, with one of the segments being shiftably fitted within the ends of the other tube. In such an arrangement, the inner segments $S_2$ and $S_3$ consist of two parts which are connected by means of the blocking or invariable condenser C to the plate potential and the grid potential which are applied across the terminals of the condenser. Thus, by shifting the inner segment, the invariable condenser may be displaced to a point where it is free from radio frequency, or, in other words, arranged at a nodal point without the tuning of the system being affected by such change in position. With such an arrangement the lack of symmetry in the construction of Fig. 2 may be avoided, since one side of the loop L may be longer than the other without changing the value of the inductance and without changing the frequency of the generator.

Other modifications, of course, will suggest themselves to those skilled in the art, and I, therefore, believe myself to be entitled to make and use any and all of such modifications as fall fairly within the spirit and scope of the present invention as defined by the hereinafter appended claims.

Having now described my invention, what I claim and desire to secure by Letters Patent is the following:

1. An oscillation generator having, in combination, an electron discharge device comprising a cathode, an anode and a control electrode, an inductance element in the form of a circular loop connecting together said anode and control electrodes, said element comprising two telescopic sections, one of said sections being movable with respect to the other section, a blocking condenser having two armatures connected in said movable section and movable therewith, said condenser separating said movable section into two segments, a source of potential connected to one armature of said condenser and to one of said segments, and another source of potential connected to the other armature of said condenser and to the other of said circular segments.

2. An oscillation generator having, in combination, an electron discharge device comprising a cathode, an anode and a control electrode, an inductance element in the form of a circular loop connecting together said anode and control electrodes, said element comprising two telescopic sections, one movable and one fixed, a blocking condenser having two armatures connected in said movable section and movable therewith, said condenser separating said section into two circular segments, a connection from one armature of said condenser to a source of potential and a connection from the other armature of said condenser to another source of potential, said fixed section also comprising two segments, said last two segments being electrically insulated from each other, one of said last two segments being connected to the control electrode of said electron discharge device, and the other of said last two segments being connected to the anode of said device.

3. In an oscillation circuit, a telescopic loop inductance in the form of a circle comprising two sections, one movable with respect to the other, a capacity element connected in substantially the middle of one of said sections and movable therewith, a vacuum tube having its grid and plate elements connected to said other section, and individual connections from both sides of said capacity element to sources of potential.

RAOUL BARANOWSKY.